April 5, 1955  G. HANSEN  2,705,434
WAVE-LENGTH INDICATOR IN SPECTRAL APPARATUS
Filed Aug. 6, 1953
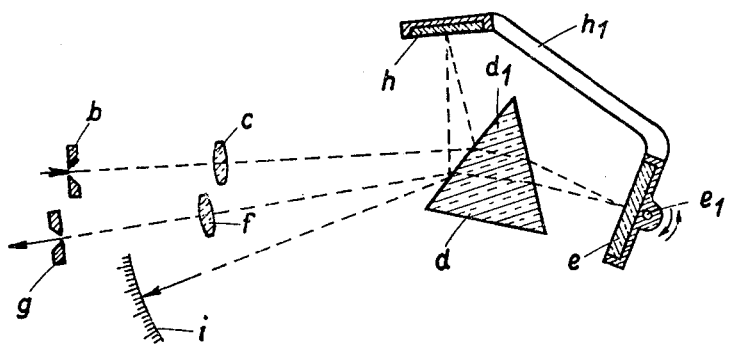

2,705,434

WAVE-LENGTH INDICATOR IN SPECTRAL APPARATUS

Gerhard Hansen, Heidenheim on the Brenz, Germany, assignor to Carl Zeiss, Heidenheim (Brenz), Germany Application August 6, 1953, Serial No. 372,693

Claims priority, application Germany August 18, 1952

1 Claim. (Cl. 88—14)

This invention relates to a reading index cooperating with a wave-length scale of a spectral apparatus.

My copending patent specification 2,664,024 relates to a spectrometer which is equipped with a rotatable mounted dispersion element using as reading index for a stationary wave-length scale an image of the entrance slit, the movement of which is effected by the rotary movement of the dispersion element.

A special object of the invention is to provide optical elements for uniting the light rays reflected by the entrance surface of a fixedly arranged dispersion element in an image of an entrance slit and projecting it onto a wave-length scale forming in this way a reading index.

To facilitate an understanding of the invention, I will explain same as employed in connection with a prism spectrometer, the prism of which is fixedly mounted.

In the accompanying drawing an execution example of the invention is represented in schematic form, namely a refracting prism is assumed as dispersion element which is traversed twice by the light rays. The light rays coming from the left arrive through an entrance slit $b$ on an objective $c$ located behind it, in whose focal plane the slit $b$ is located, and then fall upon a fixedly mounted dispersion prism $d$, which is traversed approximately at minimum deviation. Behind the prism $d$ is located a mirror $e$, which is rotatable with its mount about an axis $e_1$. The light rays reflected by the mirror $e$ traverse the prism $d$ a second time and then are focussed by an objective $f$ onto its focal plane, in which an exit slit $g$ is located. That portion of the entering light rays which are reflected by the entrance surface $d_1$ of the prism $d$, falls on a concave mirror $h$, which again throws back the light rays on the reflecting surface $d_1$ and then unites it in an image of the entrance slit $b$ at the location of a wave-length scale $i$. The mount of the concave mirror $h$ is firmly connected with the mount of the mirror $e$ by an arm $h_1$, so that the concave mirror $h$ participates in every rotatory movement of the mirror $e$. Hence the position of the image of the entrance slit $b$ produced by the concave mirror $h$ always indicates on the scale $i$ as the adjusted wave length passing the exit slit.

Having thus described my invention I claim:

Spectral apparatus comprising a light source, an entrance slit, an objective adapted to focus the light rays passing said entrance slit, a fixedly mounted dispersion element, behind said element a reflector arranged rotatable around its vertical axis and adapted to reflect the light rays refracted by said dispersion element for traversing said element a second time, an objective adapted to project the spectrum produced by said dispersion element, an exit slit arranged in the projection plane of said spectrum, a concave mirror firmly coupled with said rotatable reflector and adapted to reflect a portion of the light rays reflected by the entrance surface of said dispersion element back onto said entrance surface and adapted to unite the light rays reflected a second time by said surface in an image of said entrance slit, a wave-length scale mounted in the spectral apparatus, said image of the entrance slit being adapted to cooperate as a reading index with said wave length scale.

References Cited in the file of this patent

UNITED STATES PATENTS

| 1,899,804 | Hopfield | Feb. 28, 1933 |
| 2,307,951 | Plaut et al. | Jan. 12, 1943 |

OTHER REFERENCES

Mahan, "Oscillator Strengths for the Liquid Phase," Journal of the Optical Society of America, vol. 31, pages 248–259, Mar. 1941, pages 251–254 cited only.

Misener, "An Optical Cueing Device for Disk Playback," Journal of the Society of Motion Picture Engineers, vol. 45, pages 297–301, October 1945, pages 298, 299 cited only.